United States Patent
Marlowe

(10) Patent No.: US 6,190,582 B1
(45) Date of Patent: Feb. 20, 2001

(54) CONTROLLED ATMOSPHERE SINTERING PROCESS FOR URANIA CONTAINING SILICA ADDITIVE

(75) Inventor: Mickey O. Marlowe, Wilmington, NC (US)

(73) Assignee: General Electric Company, Schenectady, NY (US)

( * ) Notice: Under 35 U.S.C. 154(b), the term of this patent shall be extended for 0 days.

(21) Appl. No.: 09/160,325

(22) Filed: Sep. 25, 1998

(51) Int. Cl.$^7$ .................................................. G21C 21/00
(52) U.S. Cl. ........................... 264/0.5; 264/674; 252/638
(58) Field of Search ................. 264/0.5, 674; 252/638

(56) References Cited

U.S. PATENT DOCUMENTS

| | | | | |
|---|---|---|---|---|
| 3,927,154 | * | 12/1975 | Carter | 264/0.5 |
| 4,869,866 | * | 9/1989 | Lay et al. | 264/0.5 |
| 5,946,364 | * | 8/1999 | Marlowe | 376/245 |

* cited by examiner

*Primary Examiner*—James Derrington
(74) *Attorney, Agent, or Firm*—Nixon & Vanderhye

(57) ABSTRACT

Improved method of sintering for the manufacture of nuclear fuel comprising a fissionable ceramic material including a silica containing additive. The method includes controlling the sintering atmosphere to impede loss through vaporization of the silica.

17 Claims, No Drawings

CONTROLLED ATMOSPHERE SINTERING PROCESS FOR URANIA CONTAINING SILICA ADDITIVE

FIELD OF THE INVENTION

This invention relates to the sintering process and conditions employed in the production of fissionable nuclear fuel comprising an oxide of uranium containing an additive having a silica constituent.

BACKGROUND OF THE INVENTION

Fissionable nuclear fuel for nuclear reactors typically comprise one of two principal chemical forms. One type consists of fissionable elements such as uranium, plutonium and thorium, and mixtures thereof, in metallic, non-oxide form. Specifically this category comprises uranium, plutonium, etc. metal and mixtures of such metals, namely alloys of such metals.

The other principal type of nuclear reactor fuel consists of ceramic or nonmetallic oxides of fissionable and/or fertile elements comprising uranium, plutonium or thorium, and mixtures thereof. This category of ceramic or oxide fuels is disclosed, for example, in U.S. Pat. No. 4,200,492, issued Apr. 29, 1980, and U.S. Pat. No. 4,372,817, issued Feb. 8, 1983. Uranium oxides, especially uranium dioxide, have become the standard form of fissionable fuel in commercial nuclear power plants used for the generation of electrical power. However, minor amounts of other fissionable materials such as plutonium oxide and thorium oxide, and/or neutron absorbers, sometimes referred to as "poisons", such as gadolinium oxide, are sometimes admixed with the uranium oxide in the fuel product.

Uranium oxide fuel is generally produced by converting uranium hexafluoride or uranium metal to oxides of uranium. The process includes a series of chemical and physical operations, including pressure compacting uranium oxide in particulate form into handlable pellets or physically integrated bodies of suitable size and configuration, then sintering the resultant pellets or bodies of compacted particles. Sintering at high temperature coalesces the compacted particles of each pellet or body into an integrated unit of high density, and produces other desired effects such as manipulating the molecular oxygen content of the material and removal of residual undesirable impurities, e.g. fluorides.

Sintering processes are amply disclosed in the art, for example U.S. Pat. No. 3,375,306, issued Mar. 26, 1968; U.S. Pat. No. 3,872,022, issued Mar. 18, 1975; U.S. Pat. No. 3,883,623, issued May 13, 1975; U.S. Pat. No. 3,923,933, issued Dec. 2, 1975; U.S. Pat. No. 3,930,787, issued Jan. 6, 1976; U.S. Pat. No. 4,052,330, issued Oct. 4, 1977; and U.S. Pat. No. 4,348,339, issued Sep. 7, 1982.

Fissionable nuclear fuel materials for commercial power generating, water cooled and/or moderated reactors, commonly comprising pellets of uranium oxide, are typically enclosed within a sealed container formed of an alloy of zirconium metal, such as zircaloy -2 (U.S. Pat. No. 2,722,964), or possibly stainless steel, to provide a fuel element. The container, sometimes referred to in the nuclear field as "cladding", generally comprises a tube-like or elongated enclosure housing fuel pellets stacked therein end-on-end to the extent of about ¾ of the length of the containers.

Fissionable fuel is enclosed and sealed in such containers for service in nuclear reactors to isolate it from contact with the coolant and/or liquid moderator. This precludes either any reaction between the fuel or fission products and the coolant or moderator media, or contamination of the coolant or moderator with escaping radioactive matter from the fuel or fission products.

Experience has shown that after extensive exposure to the radiation in the core of an operating nuclear reactor, typical fuel elements consisting of the fissionable fuel sealed within a metal container are susceptible to failures due to breaching of their containers during or following rapid power increases. Fuel container breaching has been determined to be a result of a combination of conditions, namely, stress imposed upon the metal by thermal expansion of the contained fuel, embrittlement of the metal by prolonged exposure to radiation and stress corrosion cracking susceptibility by the presence of accumulated fission products from the fuel enclosed therein.

Studies of this deleterious phenomenon have determined that three conditions contribute to produce such a failure of the metal fuel container, which is commonly referred to in the art as "intergranular stress corrosion cracking". First, the metal must be susceptible to stress corrosion cracking in the irradiation environment; second, a level of physical stress must be present; and, third, there must be exposure to aggressive corrosive agents. Metal failure due to stress corrosion cracking can be mitigated or even eliminated by alleviating any one or more of these three conditions.

One effective means for deterring such failures in conventional fuel elements comprising zirconium alloy containers housing uranium oxide fuel has been to include a metallurgically bonded barrier liner of unalloyed zirconium metal over the inner surface of the alloy container substrate. The unalloyed zirconium metal of the barrier liner is more resistant to irradiation embrittlement than the alloy substrate whereby it retains its initial relatively soft and plastic characteristics throughout its service life notwithstanding prolonged exposure to irradiations, etc. Localized physical stresses imposed on such a barrier lined fuel container by heat expanding fuel during rapid power increases are moderated by the plastic movement of the relatively soft unalloyed zirconium metal of the liner. Moreover, the unalloyed zirconium metal has been found to be less susceptible than alloys to the effects of corrosive fission products. That is, the unalloyed zirconium has resistance to the propagation of cracks in the presence of corrosive fission products.

The effectiveness of the unalloyed zirconium barrier liners in resisting the deleterious stress corrosion cracking phenomenon due to the interaction between the fuel pellets and the container in the presence of a corrosive environment of irradiation products, is achieved by mitigating the physical stress and stress corrosion crack propagation susceptibility of the zirconium barrier layer. Effective unalloyed zirconium metal barrier linings for nuclear fuel elements comprising fuel pellets enclosed within a container are disclosed in U.S. Pat. No. 4,200,492 and U.S. Pat. No. 4,372,817.

Another approach to this problem of stress corrosion cracking as a cause of failure of fuel elements when subjected to frequent and drastic power increase has been to modify the physical properties of the uranium oxide fuel with the inclusion of additives. For example, aluminum silicates, derived from clays, when dispersed throughout the uranium oxide in amounts as low as a few tenths of one percent, have been demonstrated to be effective in increasing the plasticity of fuel pellets composed thereof, whereby the thermal expansion induced physical stress attributable to the fuel pellets is reduced. The aluminum silicate may also play a role in reducing the effectiveness and availability of the chemically aggressive fission products which promote stress corrosion cracking of the cladding tubes.

Aluminum silicate additives blended with uranium oxide have been found to be effective in eliminating or mitigating two of the three conditions which must be simultaneously present to produce stress corrosion failures in the metal of a fuel container. An aluminum silicate additive substantially increases the creep rate of fuel pellets comprising oxides of uranium and thereby reduces the stress imposed on the container due to thermal expansion of the fuel material. The enhanced plastic deformation and deformation rates attributable to this additive enables the modified fuel to flow into its own void volume or other free space in the fuel rod within the interior of the fuel container, and thereby reduce the stress applied to the cladding. Thus high localized stresses are mitigated by increased distribution of their forces.

Moreover, the aluminum silicate introduced into the fuel material reacts with fission products produced during irradiation. This reduces the concentration of aggressive fission products which, in the presence of physical stresses, are a cause of cracking in the metal of the fuel containers.

The effects of additives comprising aluminum silicates upon fissionable nuclear fuels, including their relative quantities, are disclosed in U.S. Pat. No. 3,679,596; U.S. Pat. No. 3,715,273; U.S. Pat. No. 3,826,754; U.S. Pat. No. 3,872,022; and U.S. Pat. No. 4,052,330.

However, experience in the processing or fabrication of aluminum silicate containing ceramic fuels comprising oxides of fissionable elements employing the conventional sintering procedures and conditions used for ceramic fuel has demonstrated the occurrence of distinctive shortcomings in the resulting products. Specifically, it has been found that there occurs inconsistencies in the concentrations of aluminum silicate added and in achieving the final fuel densities desired.

The conventional sintering procedures and conditions commonly used in producing fuel with uranium oxides, such as disclosed in the foregoing patents, comprises employing reducing conditions to provide for an oxygen to metal ratio of the fuel material of near or at the desired stoichiometric composition of O/M=2.00 ($UO_2$) during and following the sintering operation. For example, hydrogen or cracked ammonia sintering atmospheres with relatively low dew points, such as <10 degrees C., or hydrogen/carbon dioxide gas mixtures or carbon monoxide/carbon dioxide gas mixtures with their ratios proportionally adjusted to produce near the stoichiometric $UO_2$ compositions are typically used in sintering.

Reducing conditions with high sintering temperatures, such as about 1600 degrees C. or higher result in a relatively high vapor pressure of silicon monoxide (SiO) over silicon dioxide ($SiO_2$) and aluminosilicate, amounting to as much as a few tenths of an atmosphere. See for instance "Graphical Displays of the Thermodynamics of High Temperature Gas-Solid Reactions and Their Application to Oxidation of Metals and Evaporation of Oxides" by Lou et al, *Journal of the American Ceramic Society*, Vol. 68, No. 2 February 1985, pages 49–58.

Due to such high SiO vapor pressures, there is considerable volatilization of the silica bearing material from a uranium oxide material such as a fissionable fuel composition containing an aluminosilicate or silica bearing phase. Such a loss of silica material presents difficulties in controlling the amount of silica containing additives present in a fuel product. Moreover, because of the high vapor pressure of SiO over the silica containing additive phase, pores or voids formed within the additive phase are stabilized and achieving the desired final density is inhibited.

The disclosed contents of the foregoing U.S. Pat. No. namely U.S. Pat. No. 3,375,306; U.S. Pat. No. 3,679,596; U.S. Pat. No. 3,715,273; U.S. Pat. No. 3,826,754; U.S. Pat. No. 3,872,022; U.S. Pat. No. 3,883,623; U.S. Pat. No. 3,923,933; U.S. Pat. No. 3,930,787; U.S. Pat. No. 4,052,330; U.S. Pat. No. 4,348,339; U.S. Pat. No. 4,578,229; U.S. Pat. No. 4,200,492; and U.S. Pat. No. 4,372,817, which illustrate the state of the art relevant to the invention disclosed and claimed herein, are each incorporated herein by reference.

BRIEF SUMMARY OF THE INVENTION

This invention comprises an improved method of producing nuclear fuel products comprising an oxide of uranium incorporating a silica containing additive. The invention includes a high temperature sintering procedure wherein the atmospheric composition is regulated to inhibit losses of the silica containing additive.

OBJECTS OF THE INVENTION

It is a primary object of this invention to provide an improved method of producing a fissionable nuclear fuel product comprising an oxide of uranium and a silica containing additive.

It is also an object of this invention to provide an improved procedure for sintering a nuclear fuel composition comprising an oxide of uranium and a silica containing additive in the manufacture of fissionable fuel products.

It is a further object of this invention to provide a production procedure for manufacturing nuclear fuel comprising uranium oxide with a silica containing additive which inhibits loss of the silica containing additive during sintering.

It is an additional object of this invention to provide a method for manufacturing nuclear fuel comprising uranium oxide with an aluminum silicate additive which enables governing of the product density.

It is a still further object of this invention to provide a means of impeding loss of SiO and in turn unwanted compositional changes during sintering.

It is a yet further object of the present invention to provide a method for manufacturing nuclear fuel comprising uranium oxide with an aluminum silicate additive which allows control of the aluminum-silicate content of the product.

DETAILED DESCRIPTION OF THE INVENTION

This invention deals with nuclear fuel products produced from fissionable materials comprising oxides of uranium including a silica containing additive such as disclosed in the above patents. The fissionable material, in addition to the uranium oxide and silica containing additive, can also include oxides of plutonium or thorium, neutron absorbers or "poisons" such as gadolinia, and combinations thereof, among other ingredients disclosed in the above cited prior art. The oxides of uranium and other fissionable ceramics preferably have an oxygen to metal ratio (O/M) of approximately 2.00, namely substantially composed of uranium dioxide ($UO_2$).

The silica containing additives which are a fundamental component of this invention, likewise include those disclosed, and their amounts, as given in the above cited patents. Specific silica containing additives include silicon dioxide ($SiO_2$), aluminum silicates ($Al_2O_3.SiO_2$), natural minerals such as mullite ($3Al_2O_3 \cdot 2SiO_2$), pyrophillites ($Al_2O_3 \cdot SiO_2$), kaolinite ($Al_2(Si_2O_3) \cdot (OH)_4$), andalusite ($Al_2SiO_3$), sillimanite ($Al_2SiO_5$), and cyanite ($Al_2SiO_5$), for example. It is also possible to employ a mixture of alumina powder and silica powder, wherein the alumina and silica are present in a ratio by weight from about 0.1 alumina to 0.9 silica to about 0.9 alumina to 0.1 silica.

Alternatively, it is possible to introduce each of the silicon and aluminum as a compound which decomposes to silica and alumina under the conditions of sintering. For example, the aluminum, or at least a portion of it, may be added as an organoaluminum compound, such as for example aluminum bistearate, diethylaluminum malonate or triphenyl aluminum. The aluminum compound, especially the bistearate, would act as a pressing die lubricant, and leave alumina when the hydrocarbon portion is volatilized. An organosilicon compound may be used for the silica addition, such as for example a volatile silicon compound that will vaporize early in the sintering process. Examples include silicobenzoic acid, triethylphenylsilicane, ethyltriphenylsilicane and methyltriphenyl silicane. The organosilicon compound would produce the fugitive silicon which would be converted to silica in the sintering furnace, and would act as a pore former to control the density and structure of the sintered pellets.

The particle sizes of the alumina and silica powders may range from about 0.01 micrometers to about 100 micrometers, more usually about 0.1 to about 10 micrometers.

The silica containing additives may be present in an amount of, for example, about 0.025 percent up to about 5.0 percent by weight of the overall fuel material. Generally the silica containing additives are present in an amount of about 0.025 percent up to about 1.0 percent by weight of the overall fuel material.

With the sintering conditions commonly employed in the manufacture of uranium oxide fuel, the vapor pressure of SiO is strongly dependent upon temperature and oxygen free energy. The process is typically carried out at a temperature of at least about 1600 degrees C., more usually at least about 1700 degrees C. At 1700 degrees C., the SiO vapor pressure can range from approximately $10^{-6}$ (0.000001) to $10^{-1}$ (0.10) atmospheres, note "Review-Graphic Displays of the Thermodynamics of High Temperature Gas-Solid Reactions and Their Application to Oxidation of Metals and Evaporation of Oxides", by Lou et al, supra. At the typical sintering conditions used for urania based nuclear fuels, about 1600–1800 ° C., the vapor pressure of SiO is near $10^{-2}$ (0.01) atmospheres. Under such conditions, there can occur a considerable loss of any silica bearing material.

In accordance with this invention, the oxygen free energy of the sintering atmosphere is increased during the sintering procedure. Such an increase of oxygen free energy has been determined to decrease the vapor pressure of SiO a significant amount, namely by several orders of magnitude. For instance, when the dew point of a cracked ammonia sintering atmosphere is increased from about 10 degrees C. up to about 120 degrees C., the SiO vapor pressure during sintering at about 1700 degrees C. decreases from approximately 0.1 atmospheres down to only approximately 0.0001 atmospheres. The rate of volatilization of SiO from the sintering uranium ceramic is similarly decreased by about three orders of magnitude, thus mitigating the conditions substantially responsible for the problems of composition variations and density control due to SiO vaporization. Generally, in the present invention, the sintering process for uranium oxide based nuclear fuel materials containing silicon dioxide or aluminum silicate additives is performed in an atmosphere which produces a low SiO vapor pressure by providing and maintaining the partial molar free energy of oxygen therein of greater than −90 kilocalories per mole.

Oxygen partial molar free energy can be regulated by manipulating the gas composition of the sintering atmosphere such as by applying specific gases and or by proportioning the ratios of mixtures of gases. For example, the sintering atmosphere conditions can be achieved through the application of wet hydrogen, wet cracked ammonia (or 25% nitrogen—75% hydrogen), mixtures of carbon monoxide/carbon dioxide gases and mixtures of hydrogen/carbon dioxide gases in appropriate ratios.

Generally, sintering temperatures for the practice of this invention fall within a range of from about 1600 degrees C. up to about 2200 degrees C. More usually, the sintering is carried out within the range of about 1600 degrees C. to about 2000 degrees.

The invention will now be described with reference to the following non-limiting example.

EXAMPLE

Alumina and silica powders in a weight ratio of 0.4 $Al_2O_3$/0.6 $SiO_2$ are blended with uranium dioxide powder to achieve a total addition of 0.25 wt % of the alumina/silica with 99.75% uranium dioxide. The blended powders are dry-pressed to a green density of approximately 5.6 gm/cm$^3$ to form powder compacts in the form of right circular cylinders for sintering to fuel pellets.

The dry pressed pellets are sintered using a furnace feed gas of 75% hydrogen—25% nitrogen which has been moisturized by passing the gas through a water bubbler with the temperature of the water in the bubbler maintained at 55° C. and a total furnace gas pressure of 1 atmosphere (760 mm Hg). At 55° C., the vapor pressure of water is 118 mm Hg, the hydrogen and nitrogen gas pressures of the furnace feed gas are 481.5 and 160.5 mm Hg, respectively, and the $H_2O$ to $H_2$ ratio of the furnace gas atmosphere is 118/481.5= 0.245.

The sintering furnace temperature profile is maintained to provide prolonged (~4 hours) sintering at 1750° C. in the hot or working zone of the sintering furnace. At that sintering temperature, for the $H_2O$ to $H_2$ ratio noted above, the oxygen free energy in the hot zone of the sintering furnace is maintained at about −70 kcal/mole, the O/U ratio of the uranium oxide during the sintering operation is maintained at about 2.005, and the vapor pressure of SiO is maintained at about $10^{-5}$ (0.00001) atmospheres. For these sintering conditions, the desired final fuel pellet density of 10.5 gm/cm$^3$ is achieved, and the aluminum and silicon contents of the final sintered pellets are within acceptable ranges of the initial amount added.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing a fissionable nuclear fuel product comprising a compacted body of an oxide of uranium containing silica, comprising the step of sintering the silica containing particulate oxide of uranium at a temperature of at least about 1600° C. in a controlled sintering atmosphere providing and maintaining a partial molar free energy of oxygen greater than −90kilocalories per mole.

2. The method of producing a fissionable nuclear fuel product of claim 1, wherein the particulate oxide of uranium undergoing sintering contains an aluminosilicate compound.

3. The method of producing a fissionable nuclear fuel product of claim 1, wherein the particulate oxide of uranium undergoing sintering contains a mixture of alumina and silica powders.

4. The method of producing a fissionable nuclear fuel product of claim 1, wherein the particulate oxide of uranium undergoing sintering contains an aluminosilicate derived from natural minerals.

5. The method of producing a fissionable nuclear fuel product of claim 1, wherein the particulate oxide of uranium undergoing sintering contains a compound which converts to alumina during sintering.

6. The method of producing a fissionable nuclear fuel product of claim 5, wherein the compound which converts to alumina during sintering is selected from aluminum bistearate, diethylaluminum malonate and triphenyl aluminum.

7. The method of producing a fissionable nuclear fuel product of claim 1, wherein the particulate oxide of uranium undergoing sintering contains a compound which converts to silica during sintering.

8. The method of producing a fissionable nuclear fuel product of claim 7, wherein the compound which converts to silica during sintering is selected from silicobenzoic acid, triethylphenyl silicane, methyltriphenyl silicane and ethyltriphenyl silicane.

9. The method of producing a fissionable nuclear fuel product of claim 1, wherein the particulate oxide of uranium containing silica is sintered in an atmosphere comprising at least one gas selected from the group consisting of wet hydrogen, wet cracked ammonia, hydrogen/carbon dioxide, carbon monoxide/carbon dioxide, nitrogen/hydrogen/water vapor, hydrogen/water vapor, hydrogen/oxygen, carbon monoxide/hydrogen, and combinations thereof.

10. A method of producing a fissionable nuclear fuel product comprising a compacted body of particulate oxides of uranium containing a silica constituent, comprising sintering the silica constituent containing particulate oxides of uranium at a temperature of at least about 1600° C. in a controlled sintering atmosphere containing oxygen maintained at a partial pressure providing a partial molar free energy of the oxygen content greater than −90 kilocalories per mole.

11. The method of producing a fissionable nuclear fuel product of claim 10, wherein the particulate oxide of uranium undergoing sintering contains an aluminosilicate compound.

12. The method of producing a fissionable nuclear fuel product of claim 10, wherein the particulate oxide of uranium undergoing sintering contains an aluminosilicate clay.

13. The method of producing a fissionable nuclear fuel product of claim 10, wherein the particulate oxide of uranium containing a silica constituent is sintered in an atmosphere comprising at least one gas selected from wet hydrogen, wet cracked ammonia, carbon monoxide/carbon dioxide mixtures and hydrogen/carbon dioxide mixtures.

14. A method of producing a fissionable nuclear fuel product comprising a compacted body of particulate oxide of uranium containing a silica constituent, comprising sintering the silica constituent containing particulate oxides of uranium at a temperature of at least about 1600° C. in a controlled sintering atmosphere containing oxygen which is increased to and maintained at a partial pressure providing a partial molar free energy of the oxygen content greater than −90 kilocalories per mole of oxygen.

15. A method of producing a fissionable nuclear fuel product comprising a compacted body of particulate oxide of uranium containing a silica constituent, comprising sintering the silica constituent containing particulate oxide of uranium at a temperature of at least about 1600° C. up to about 2200° C. in a controlled atmosphere comprising a mixture of hydrogen and carbon dioxide proportioned to produce and maintain an oxygen partial pressure providing a partial molar free energy of oxygen content greater than −90 kilocalories per oxygen mole.

16. The method of producing a fissionable nuclear fuel product of claim 15, wherein the particulate oxide uranium undergoing sintering contains an aluminosilicate compound.

17. The method of producing a fissionable nuclear fuel product of claim 15, wherein the particulate oxide of uranium undergoing sintering contains an aluminosilicate derived from natural minerals.

\* \* \* \* \*